United States Patent
Tuite et al.

(10) Patent No.: US 6,617,484 B1
(45) Date of Patent: Sep. 9, 2003

(54) CONTAINMENT AND TRANSPORTATION OF DECOMMISSIONED NUCLEAR REACTOR PRESSURE VESSELS AND THE LIKE

(75) Inventors: Peter T. Tuite, Cortlandt Manor, NY (US); Kevin T. Tuite, Cornwall, NY (US); Albert A. Freitag, Washingtonville, NY (US)

(73) Assignee: WMG, Inc., Peekskill, NY (US)

( * ) Notice: Subject to any disclaimer, the term of this patent is extended or adjusted under 35 U.S.C. 154(b) by 0 days.

(21) Appl. No.: 09/552,460

(22) Filed: Apr. 18, 2000

(51) Int. Cl.[7] .............................. G21F 9/00; G21F 9/36
(52) U.S. Cl. ..................... 588/16; 250/506.1; 588/2; 588/3; 588/4; 588/15; 588/249; 588/252
(58) Field of Search ................. 588/1, 2, 3, 4, 588/15, 16, 249, 252; 250/506.1, 505.1, 515.1; 376/260

(56) References Cited

U.S. PATENT DOCUMENTS

| | | |
|---|---|---|
| RE29,876 E | 1/1979 | Reese |
| 4,168,243 A | 9/1979 | Gablin et al. |
| 4,232,730 A | 11/1980 | Reese |
| 4,234,798 A | 11/1980 | Baatz et al. |
| 4,272,683 A | 6/1981 | Baatz et al. |
| 4,274,007 A | 6/1981 | Baatz et al. |
| 4,278,892 A | 7/1981 | Baatz et al. |
| 4,288,698 A | 9/1981 | Baatz et al. |
| 4,447,733 A | 5/1984 | Baatz et al. |
| 4,486,512 A * | 12/1984 | Tozawa et al. ............. 428/623 |
| 4,626,380 A | 12/1986 | Baatz et al. |
| 4,800,283 A | 1/1989 | Efferding |
| 4,818,878 A | 4/1989 | Popp et al. |
| 5,061,858 A | 10/1991 | Mallory |
| 5,121,849 A | 6/1992 | Ellingson et al. |
| 5,263,062 A | 11/1993 | Guigon et al. |
| 5,297,182 A | 3/1994 | Cepkauskas |
| 5,329,562 A | 7/1994 | Kubo et al. |
| 5,555,280 A * | 9/1996 | Cartry ........................ 376/260 |
| 5,678,234 A | 10/1997 | Colombo et al. |
| 5,894,134 A | 4/1999 | Kissinger |
| 5,995,573 A | 11/1999 | Murray, Jr. |
| 6,087,546 A * | 7/2000 | Griffiths et al. ................. 588/3 |

* cited by examiner

Primary Examiner—Wayne A. Langel
(74) Attorney, Agent, or Firm—Brown Raysman Millstein Felder & Steiner LLP (57) ABSTRACT

Method and apparatus for containing, transporting, and storing or disposing of radioactive machinery, including decommissioned nuclear reactor pressure vessels. An improved, economically-produced container is provided which allows easier handling and packaging of machinery within plants where the machinery has been installed, and which provides improved shock absorption and attenuation characteristics, especially when packaging is complete. A reactor pressure vessel or similar item is disconnected from the remainder of the plant and external fittings are trimmed as close to flush with item's exterior as practicable. A storage and containment canister, optionally cut into at least two sections to ease handling and packaging, is placed nearby. The pressure vessel head or any other low-radioactive items are removed, and insulation and other items removed from the outside of the item are placed inside the item's body. The item body is placed into a lower section of the canister and sealed, and detached canister sections are reattached. Gaps between the canister and the RPV body and preferably the interior of the RPV body are filled with grout or low denisity cellular concrete. The canister is closed, and the pressure vessel head or other removed portions are secured to the outside of the canister. Optionally the canister exterior is sealed with a metalizing spray. The complete package is transported for storage or disposal.

26 Claims, 6 Drawing Sheets

CONTAINMENT AND TRANSPORTATION OF DECOMMISSIONED NUCLEAR REACTOR PRESSURE VESSELS AND THE LIKE

BACKGROUND

The invention is related to the containment of radioactive items, and in particular to methods and apparatus for the containment, transportation, and storage or disposal of decommissioned nuclear reactor pressure vessels.

Nuclear power is now a mature technology. In the United States more than a hundred nuclear power plants have been at work for decades, providing a substantial portion of the commercial electrical power sent to the nation's power grid.

Like most machines, however, nuclear power plants, and in particular the nuclear reactors which form the hearts of nuclear power plants, have limited useful lifetimes. And when their useful lives have expired nuclear reactors must, like other machines, be disposed of. But nuclear machines present more complex disposal problems than most non-nuclear machines. Nuclear machines, and in particular nuclear reactors, are, in significant part, radioactive, and therefore require special handling and containment. And when such machines must be moved for storage (or, in most cases equivalently, for disposal), the problems associated with their containment are compounded.

To date few nuclear reactors have been decommissioned or otherwise processed for disposal. This is particularly true of reactors of substantial size. In fact, only four nuclear reactor pressure vessels of relatively large size have been transported for disposal. These reactors are of the pressurized water (PWR) type and include reactors from the Shippingport, Trojan, Yankee Rowe and Saxton plants. And throughout the process of dismantling and removing these four reactors it was noted that improved methods and apparatus were needed.

In two of these instances, Trojan and Saxton, the reactor pressure vessel (RPV) was transported intact containing all of the highly radioactive internals components, in operating configuration. In the handling of these PWR pressure vessels it was determined that one preferred method for transporting a decommissioned RPV would be to place the RPV with its internals within another container, the container adapted to provide both shielding and structural integrity for the RPV and its contents during transportation. To date only with the Saxton RPV was this tried.

Figure 1:
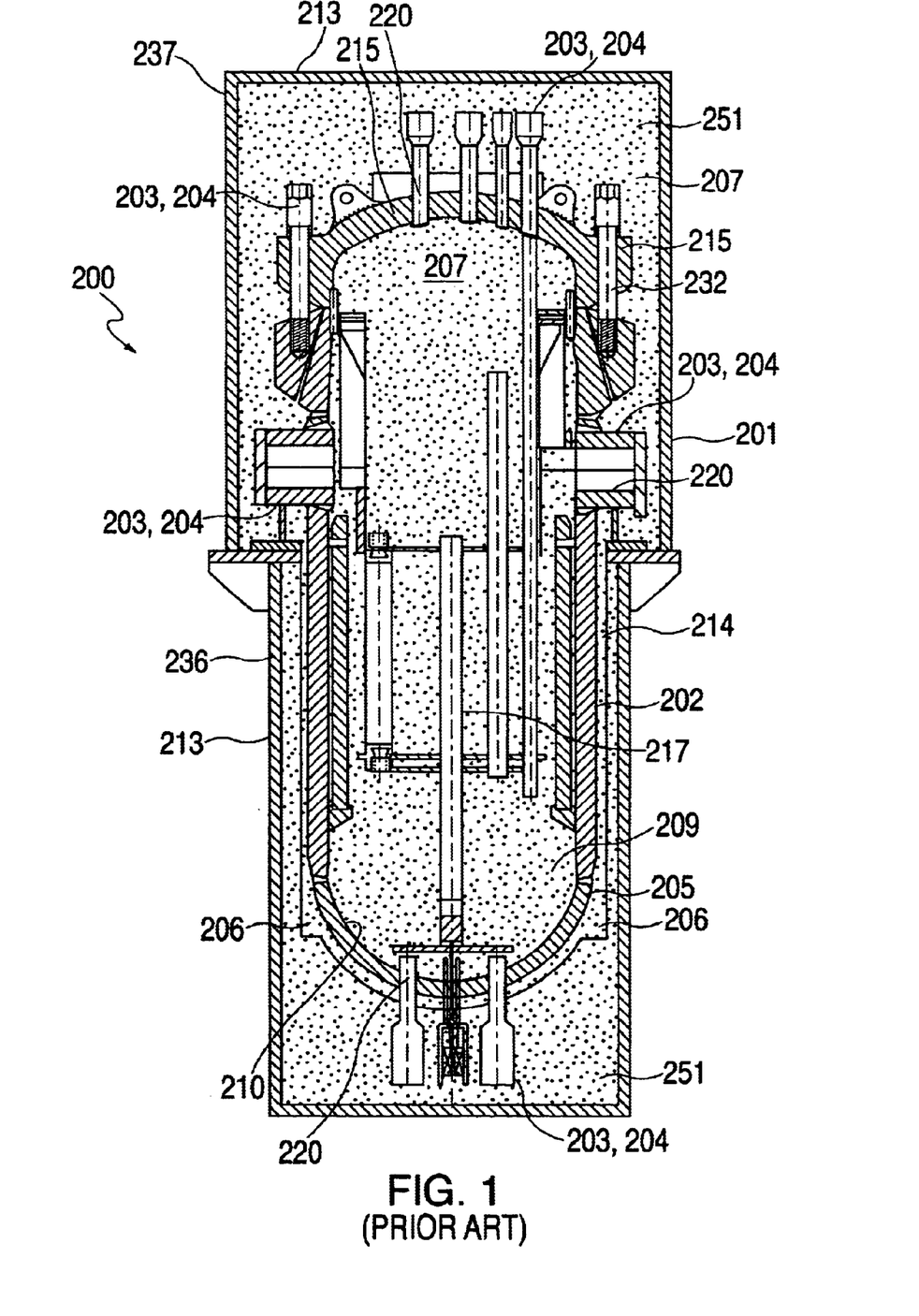
FIG. 1 is a cutaway schematic elevation of a prior art nuclear reactor pressure vessel containment package.

To meet the stringent requirements for safe containment during transportation and disposal of such a potentially dangerous item as the Saxton RPV, highly specialized and innovative apparatus and methods were employed. The reactor pressure vessel was disconnected from the piping which connected it to the remainder of the power plant, and placed otherwise intact, with its internal components in operating configuration, its pressure head in place, and with its inlet and outlet nozzles untrimmed, within another container, encased in grout to hold it in place within one section of the container, and transported. The containment configuration used in the Saxton decommissioning is illustrated in FIG. 1. Containment package 200 comprises RPV 202 and canister 201. Canister 201 comprises first and second sections 236 and 237, respectively. RIPV 202, intact with all internals 217 (not shown in their entirety) and with reactor pressure head 215 in place, firmly attached to the RPV by means of head-to-body attachments 232, is disposed within canister 201. External fittings 203 have been severed, but substantial portions 204 of the fittings have been left in place. External insulation 206 has been left in place. Interior 209 of RPV 202 has been filled with grout, and gap 251 between RPV body 214 and the canister has been filled with grout. Surface contaminants have been sealed by grout on RPV interior surface 210 and on RPV exterior surface 205. Exterior surface 213 of canister 201 comprises no fenders or other protection against shocks.

While the containment apparatus and the methods applied in decommissioning the Saxton RPV represented an innovative approach to the problem of transporting a large radioactive waste item, it became increasingly clear to those concerned as work progressed that there was substantial room for improvement. For exanple, the container, being designed for containment of the entire RPV, with its internal structures, the head, external insulation, and all external fittings in place and intact, was substantially larger and heavier than necessary. The complete package measured about 21½ feet in length, 9 feet in diameter, and weighed about 120 tons. And Saxton was a relatively small and light reactor vessel package. Therefore, when larger PWR and boiling water reactor (BWR) pressure vessels, often weighing in excess of 600 tons without container packaging, are considered, it becomes necessary to consider improved methods of handling and packaging.

Other approaches for the handling and transport of radioactive waste for disposal have been suggested, but none provides a truly satisfactory solution to the particular problems associated with the containment and transportation of large radioactive machinery such as RPVs of commercial size. For example, U.S. Pat. No. 5,894,134 to Kissinger, "SHIPPING CONTAINER FOR RADIOACTIVE MATERIAL", and U.S. Pat. No. 5,061,858 to Mallory, "CASK ASSEMBLY FOR TRANSPORTING RADIOACTIVE MATERIAL OF DIFFERENT INTENSITIES", describe tubular shipping containers for radioactive material comprising impact imiters disposed at either end of the containers; U.S. Pat. No. 5,297,182 to Cepkauskas, "METHOD OF DECOMMISSIONING A NUCLEAR REACTOR", discloses a method for encapsulating portions of the reactor vessel and reactor internals into a solid reactor capsule and then converting this reactor capsule into a plurality of decommissioned segments; and U.S. Pat. No. 5,263,062, Guigon et al., "PROCESS AND APPARATUS FOR DISMANTLING THE INTERNAL EQUIPMENT OF A WATER-COOLED NUCLEAR REACTOR", discloses a method of decommissioning a water-cooled nuclear reactor vessel where elements of the vessel are separated and compacted underwater for extraction and further transport. But the containment vessels and methods disclosed are not suitable to the safe, efficient, and economical containment, storage or disposal, and transport of decommissioned nuclear reactor pressure vessels. Their construction is more complex, and therefore more costly, than necessary; and the resultant containment package is either larger and heavier than need be or is cut at great expense and considerable risk to personnel into a number of smaller, yet still heavy, objects which must be transported and stored separately. None of these adequately addresses questions of weight, bulk, shock absorbency, or manageability for dismantlement, containment, and transport of nuclear RPVs or similar large radioactive machinery in the decommissioning process.

Thus there is a need for suitable and efficient methods and apparatus for containing, storing, and transporting nuclear reactor pressure vessels with essential intact internals components, and other radioactive machinery items, particularly during the decommissioning, dismantlement, or disposal process.

BRIEF SUMMARY OF THE INVENTION

It is an object of the invention to provide methods and apparatus for containing, transporting, storing, and disposing of nuclear reactor pressure vessels and other radioactive machinery items, particularly during the decommissioning or dismantlement processes.

It is another object of the invention to provide such methods and apparatus which result in lighter and safer packages which provide adequate containment and also meet federal and state requirements for transport, storage, and disposal.

It is another object of the invention to provide such methods and apparatus which result in smaller and more easily, safely, and economically handled packages for containment, transport, storage, and disposal.

It is another object of the invention to provide such methods and apparatus which provide improved containment and shielding for radioactive portions of items stored within the items themselves.

It is another object of the invention to provide such methods and apparatus which result in packages having improved shock absorption and dissipation characteristics during transport.

It is another object of the invention to provide light, safe, durable, and effective containers for decommissioned nuclear reactors and the like, which are economically and reliably produced and easy to employ.

These and other objects are achieved by the apparatus and methods disclosed herein. The invention provides method and apparatus for containing, transporting, and storing or disposing of radioactive machinery, including in particular decommissioned nuclear reactor pressure vessels. An improved, economically-produced container is provided which allows easier handling and packaging of machinery within plants where the machinery has been installed, and which provides improved shock absorption and attenuation characteristics, especially when packaging is complete. A reactor pressure vessel or similar item is disconnected from the remainder of the plant and prepared for packaging by being reduced to the smallest practicable dimensions for packaging, transport, and storage by removing or trimming as close to flush with the exterior of the device body as is practicable and removing any removable sections of the device and any protruding external fittings. In the case of, for example, a reactor pressure vessel (RPV), the pressure vessel head is removed and insulation and other items are removed from the outside of the pressure vessel and placed inside the vessel. A storage and containment canister, optionally cut into at least two sections to ease handling and packaging, is placed near the device.

The device is placed into a lower section of the canister and sealed so as to immobilize surface contaminants, and any detached canister sections are reattached so that the canister body is complete and substantially encloses the device. The canister is filled with a support or stabilizer substance such as a grout or low-density cellular concrete to aid in sealing surface radioactive particles in place and to help support and to help secure the device inside the canister. The canister is closed, and any removed portions of the device, as for example the pressure vessel head, are optionally secured to the outside of the canister. Preferably all penetrations through the canister exterior are sealed. The packed and sealed canister is ready to be transported to a storage location or stored on site.

In one aspect the invention provides a method for containing nuclear reactor pressure vessels or the like for transportation and storage. The method comprises removing one or more external fittings from the device in such manner that unremoved portions of the fittings are trimmed as close to flush with the external surfaces of the device as is practicable, so as to minimize the size of the device to its lowest economical limits; and disposing the device within a canister. The space between the canister is filled with a stabilizer and the canister is closed.

In practicing this aspect of the invention it is advantageous to minimize the size or overall dimensions of the device to be packaged, particularly by reducing the length of any protruding attachments or fittings, so as to minimize the size and weight of the closed or completed package. Among other advantages, this reduction in size and weight eases handling, transportation, and storage of the package when it is complete. This is accomplished in part by cutting away or otherwise removing various fittings which connect the device to the rest of a plant, such as cooling water nozzles, control lines, and the like, and trimming them as flush with the body of the device as is practicable. Many devices of the type for which use of the invention is contemplated, and in particular RPVs, comprise large or robust structures which cannot conveniently or advantageously be altered or removed, and which limit the extent to which the size of a given device may be economically reduced. For example, many devices of the type for which use of the invention is contemplated comprise large openings or access features which incorporate heavy flanges, such as the head-to-body joint flanges present on many PWR and BWR pressure vessels. In containing such devices it is generally advantageous to trim external fittings and connections, such as heavy-gage cooling water nozzles and the like, as close to flush with the outer perimeters or surfaces of these features as economical or practicable, but is not practicable to remove them all the way to the surface of the device body itself-although that would be preferable, if reasonably possible. In the case of reactor pressure vessels, this can ean trimming water nozzles and the like such that they are substantially flush with the headbody flange, or preferably trimmed to within the outer contours or perimeters of such flanges. In such cases the canister required for containment of the RPV must thus generally be large enough to enclose the flange, preferably and no larger. It is generally sufficient in such cases to detach the RPV from all external connections and trim the heaviest of such connections to or within the contour of the flange perimeter, for example, and to leave remaining portions of such relatively heavy or robust structures protruding somewhat from the body of the RPV. The foregoing will serve as guidance to those of ordinary skill in the art of dismantling such machinery on the trimming of external fittings in practicing the invention. Trimming in such fashion can greatly ease the physical task or cost of trimming or removing such fittings without incurring a substantial size or weight penalty in the finished containment package.

In practicing this aspect of the invention it will be noted that disposing items such as RPVs into the types of containment vessels and canisters contemplated often results in the leaving of gaps between the outer surface of the RPV, which is usually at least somewhat irregularly shaped, and the interior surface of the contianment canister. It is generally advantageous in practicing this aspect of the invention to fill such gaps with a stabilizing substance. Preferably this stabilizer is poured into any such gaps in an unset liquid state, so as to flow into and substantially, or preferably completely, fill the gaps. Such stabilizers comprise any subtances which after setting are capable of supporting a substantial portion of the load imposed by the enclosed device on the container under the types of conditions to which the container package is likely to exposed, such as during transportation conditions, or of attenuating a shock administered to the canister so that any damage to the contained device is minimized, and referably aid in immobilizing contaminants located at or near the various surfaces of the contained device. Such stabilzers include, for example, both high- and low-density grouts or concretes. It is to be understood that while such substances will in many instances not completely fill gaps of the type which are likely to appear in such packages, they can be expected to fill such gaps substantially enough to serve the purposes described. This is what is meant by saying tht such gaps are substantially filled. In addition to providing the structural benefits described, preferred stabilizers absorb radiation, so as to aid the shielding function of the canister, in addition to providing structural support. One example of a suitable class of stabilizers comprises low density cellular concretes (LDCCs) having densities of between 25 and 90 pounds per cubic foot (pcf), and having strengths varying between 800 and 1,200 pounds per square inch. Such concretes are well known in the industry. For use between the canister interior and the RPV exterior, nominal 70 pcf concretes are preferred; for use within the RPV, to immobilize contaminants and secure various internal fittings and items stored inside the RPV, nominal 30 pcf concretes are preferred.

Optional and generally preferred additional features of this method aspect of the invention comprise disposing various removed components, such as external fittings, within the interior of the device body, as for example the RPV interior; coating interior and/or exterior surfaces of the device body with sealants to immobilize surface contaminants, and sealing the canister after it has been sealed with a metalizing spray.

A particularly advantageous means of reducing the size of the packaged item and therefore the overall size and weight of the complete containment package is to remove portions of the device to be contained from the exterior of the device, and to place them within open spaces within the device prior to closing of the containment canister. For example, portions of water nozzles, control structures, and insulation removed from the exterior of a RPV are placed inside the pressure vessel, often in space vacated by the removal of especially-highly radioactive components such as for example portions of the core barrel, the core baffle assembly, and the lower core plate, which require storage or disposal separate from the bulk of the RPV.

Sealants suitable for immobilizing surface contaminants in accordance with this aspect of the invention comprise paints, epoxies, resins, and any other substances capable of fixing radioactive substances in place on surfaces of nuclear RPVs or other contained devices. Such sealants are well known in the industry.

The use and various types of metalizing sprays suitable for sealing the canister package after the canister has been closed are well known, and their selection and employment will not trouble those having ordinary skill in the relevant arts. One example of a metalizing spray suitable for use with this aspect of the invention are the sprays developed for corrosion control and available from the International Metalizing Corporation of Cherry Hill, N.J. Such sprays include zinc, lead, nickel, monel, aluminum, copper, bronze, brass, stainless steel, hastelloy, titanium, babbit, and inconel sprays. The selection of suitable sprays will depend upon the materials used in fabrication of the canister, but appropriate combinations are well known and will not trouble designers of ordinary skill once they have been acquainted with this disclosure. The use of metalizing sprays in sealing canister penetrations ensures integrity of the containment boundary between the contents of the containment package and the environment.

An additional particularly advantageous means of reducing the size of the packaged item and therefore the overall size and weight of the complete containment package is to remove portions of the device to be contained, and in particular any relatively large portions having low radioactivity, and attaching them to the exterior of the canister. For example, it is extremely useful in packaging pressure vessels to remove the RPV head, which is typically both large and not highly radioactive, and to fix it to the exterior of the canister. Preferably any contact points or openings between the canister exterior and exposed portions of the contained device are sealed, such as for example through the use of metalizing sprays as described herein. The removal of a reactor pressure vessel head and attachment of it to the exterior of the containment package can, for example, reduce the size and weight of the package by 10–20 percent or more, without unacceptable increases in release of radiation to the environment. The selection of portions of items to be contained for attachment to the exterior of the containment package will be well within the ability of those skilled in the art, once they have been armed with this disclosure. Typically guidance will be offered by national or regional guidelines for the storage, transportation, or disposal of radioactive items. Typically levels on the order of 0.5 curies or less are appropriate, although sometimes higher levels are appropriate; depending upon local health and enironmental standards and requirements.

It may be seen that a preferred and especially useful application of the methods and apparatus of the invention comprises removing a head, at least a substantial portion of all protruding external fittings, and at least a substantial portion of external insulation from a nuclear reactor pressure vessel; removing a portion of the reactor's internals from the interior of the pressure vessel; relocating or disposing at least some of the removed external fittings, insulation, and internals within the interior of the pressure vessel; sealing any penetrations in the pressure vessel body, such as penetrations for cooling water nozzles, control structures, or the like; disposing the pressure vessel within a container; closing and sealing the container, and attaching the RPV head to the exterior of the container. Optionally some portion of the insulation, external fittings, etc., are left out for separate disposal. Similarly, the most highly radioactive portions of the reactor internals can be removed, contained, and shipped separately in a substantially smaller and more easily handled package than the main RPV body. In practicing this aspect of the invention it is suggested that the RPV head removed and upper internals removed, as for fueling the reactor, with the reactor coolant or other liquid left in place within the RPV body so as to act as shield against radioactivity. After the upper internals have been removed the coolant or other liquid is drained to the level of the water inlet or outlet nozzles, the nozzles are plugged, and the remainder of the coolant or other liquid is drained. An additional shield, such as a steel plate, is then placed atop the remaining unremoved portions of the reactor internals, at least a portion of the removed materials are placed within the RPV cavity, and the container is closed, preferably after the addition of grouts or other sealants as described herein, both to immobilize surface contaminants and to fill gaps between the RPV body and the containment canister, to act as shielding and to provide shock absorption and attenuation. Preferably the canister is sealed, as through the use of a metalizing spray or other means such as welding, and is ready for transportation and storage.

In another aspect the invention provides apparatus for the containment, transportation, and storage of decommissioned nuclear reactor pressure vessels and the like. The apparatus comprises a canister adapted for reception of a nuclear reactor pressure vessel. The canister has a body, an interior, a closed end, and means for closing the canister, preferably in the form of an attachable lid. The interior of the canister is adapted, generally by virtue of its size and shape, to receive the radioactive item, or at least in general the most highly radioactive portions of the item. The body is generally tubular, and often elongated, so as to accommodate radioactive machinery of the type contemplated herein, and especially nuclear reactor pressure vessels, particularly of the PWR and BWR types, which are generally of elongated and substantially cylindrical shape. In saying that the body is tubular it is not intended to limit this aspect of the invention solely to canisters of substantially circular cross section. Preferred canisters are circular or elliptical in cross section, because they are fabricated of sheet or plate materials, and in particular metals such as steel, and the fabrication of circular or elliptical tubes from sheet or plate material can be particularly economical, but as will immediately occur to those skilled in the art of such devices a great many non-circular or non-elliptical cross sectional shapes will serve as well, depending upon the size and shape of the radioactive item to be stored within the canister, the method of transportation, and particular storage or disposal requirements. Square, rectangular, triangular, and other cross-sectional shapes are regarded as falling within the scope of the invention, so long as they function and may be fabricated substantially as contemplated and disclosed herein.

Preferred canisters according to the invention comprise integral sacrificial fenders located adjacent either or both ends of the canister body for attenuating shocks administered to the canister. Preferably the fenders comprise simple extensions of the canister body, formed by rolling or otherwise forming the body from sheet or plate material and adding top and bottom closures removed from the top and bottom edges of the body, so that portions of the body extend past the closures. These body extensions act as fenders by attenuating shocks, etc., administered to the canister by bending. Bending of the fenders to absorb the energy thus imparted to the canister can be either elastic or plastic in nature, or both. Fabrication of fenders in this manner is very economical, as no additional parts, forming, joining, or other processing is required, and represents a marked improvement over state of the art fenders, which comprise speciallyfabricated separate parts which must be made and attached at added expense, with additional labor. Optionally fenders according to the invention are long enough to provide protection not only to the containment package as a whole, and in particular to the packaged radioactive item, but also to any additional items, such as removed reactor vessel pressure head, attached to the exterior of the canister. Canisters having fenders of the type described and adapted for reception of large commercial RPVs have been analyzed to show compliance with United States Department of Transportation (USDOT) requirements for the shipping of radioactive items. In particular, the canister designed for reception and transport of the Connecticut Yankee RPV has been analyzed for compliance with USDOT one-foot horizontal drop and one foot drop with two-feet slapdown on either end criteria, and shown to satisfy all requirements.

Canisters according to this aspect of the invention are advantageously fabricated in single-piece lengths adequate for reception of the entire radioactive item to be contained. However, it has been found that canisters of such length, and particularly those adapted for the containment of commercial PWR and BWR pressure vessels, are often unnecessarily unwieldy and difficult to handle within the confines of plants of the type in which such devices are typically installed. An advantage of canisters according to this aspect of the invention is that they are easily separable into two or more sections, as for example by conventional mechanical cutting methods, with one section being placed near the radioactive item selected for containment so that the item may be placed within the canister body with a minimum of handling, and in particular without being lifted very high. Preferred methods for separating the canister into separate sections provide for severing the sections and leaving a clean, relatively straight edge for later mating and rejoining. Once the item has been placed within the canister body in this fashion any detached portions of the canister may be repositioned and rejoined, as for example by welding. As will occur immediately to those skilled in the joining of structures in the manner described herein, reinforcing or backing plates or doublers may be used to ensure the structural strength and integrity of the rejoined canister structure.

A particular advantage of fabricating canisters according to this aspect of the invention as integral wholes, then cutting or otherwise separating and loading them and reattaching them is that the various sections, on being rejoined, are already sized for perfect and immediate fit, regardless of the cross-sectional shape of the canister, since they were originally formed as a single, integral whole. This offers substantial savings in labor and costs when compared to alternatives comprising mechanically more complex joints, with necessarily more rigorous size and shape controls or realignments to ensure proper mating on reassembly.

Canisters according to this aspect of the invention preferably serve both as primary structure for lifting, handling, and transport of the radioactive items packaged within them, and as the primary containment boundary between the radioactive items, including internal structures such as fuel rods, core parts, and the like, and the environs. This can be accomplished by using any of a wide range of known materials, including structural steel. Any materials having sufficient radioactive shielding and strength qualities will serve. The selection of suitable materials and gages will not trouble designers of ordinary skill in the art, once they have been armed with this disclosure.

An optional and particularly advantageous feature of canisters according to the invention is the adaptation of one or more portions of the exterior of the canister, and in particular the canister lid, for attachment of one or more portions of the radioactive items to be stored within them. For example, advantages offered by attachment of the pressure head of a reactor pressure vessel to the exterior of the containment canister have been discussed. Optionally, attachment of such portions to the exterior of the canister can be accomplished by using existing attachment structures on the stored item or portions thereof. For example, in the Connecticut Yankee decommissioning it has been proposed by the inventor herein that the RPV head be attached to the canister exterior through the use of existing head-to-body attachment or closure studs provided on the head flange of the pressure vessel. The canister lid is provided with holes suitable for passage of the closure studs, so that the stud ends protrude from the closed containment package, and the head is placed back upon the closure studs and bolted back in place, with the canister lid sandwiched between the head and the RPV. This not only provides secure attachment of the head to the exterior of the containment package, but additional support for the RPV itself inside the canister as well. In many instances it is suitable and advantageous for attachment of the low radioactive part to the exterior of the containment canister to the interior by use of existing attachment structures to comprise the sole attachment between the stored waste item and the canister.

Optional additional features of containers according to this aspect of the invention include one or more secondary shields, either disposed circumferentially about the inner or outer periphery of the canister or located entirely within the canister, and even within the interior of the packaged radioactive item, so as to provide internal shielding between portions of relatively high radioactivity and the environs, or between regions of relatively high and relatively low radioactivity, especially during loading or packing operations. In the latter case, the location of the shield can vary, depending upon the contents of the container package and/or the stored item.

Additional optional features of containers according to this aspect of the invention include stabilizers for disposition between the waste item and the canister, and for placement inside the waste item interior, as herein described; and attachment of trunnions and/or other rotating fixtures for turning the canister about its longitudinal axis and so ease handling during and after the packing process. An especially simple and economical means of providing for such fixtures is by attaching the lower canister atop a truncated cylinder or hoop rotating fixture of rolled or otherwise formed sheet or plate material similar to that used to manufacture the canister, the fixture diameter of a dimension suitable to permit the fixture to fit within the sacrificial fender extending from the canister body and the bottom edge of the fixture provided with wheels; the canister is left to rotate freely atop the fixture and a secure mating is assured through simple gravitational means. The fixture is removed by simply lifting the canister off and disconnecting the fixture from the canister.

In another aspect the invention provides a method of fabricating a containment vessel as disclosed herein, for use in removing a nuclear reactor pressure vessel or other radioactive waste item from a reactor plant, the method comprising the steps of fabricating a tubular body of sufficient cross-sectional dimension and length to accommodate the waste item from a structural sheet or plate material (for purposes of this disclosure the terms "sheet and plate" are synonymous); closing an end of the tubular body; dividing the tubular body into a plurality of sections, the sections of suitable length for allowing at least one section, preferably the section having the enclosed end, to be disposed in a position proximate the installation location of the waste item to facilitate placement of the waste item within the closed section; and thereafter disposing a second section of the tubular body adjacent the closed section, so that the sections may be rejoined or otherwise reattached.

It is important to note that except as inherently required by the processes themselves, the order in which the steps of the methods disclosed and claimed herein is of no significance. In many instances it is possible to change the order of the steps. Those cases in which it is or is not possible to alter the order of steps disclosed or claimed herein will be apparent to those of ordinary skill in the relevant arts as they contemplate carrying out the processes.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE PREFERRED EMBODIMENTS

Figure 2:
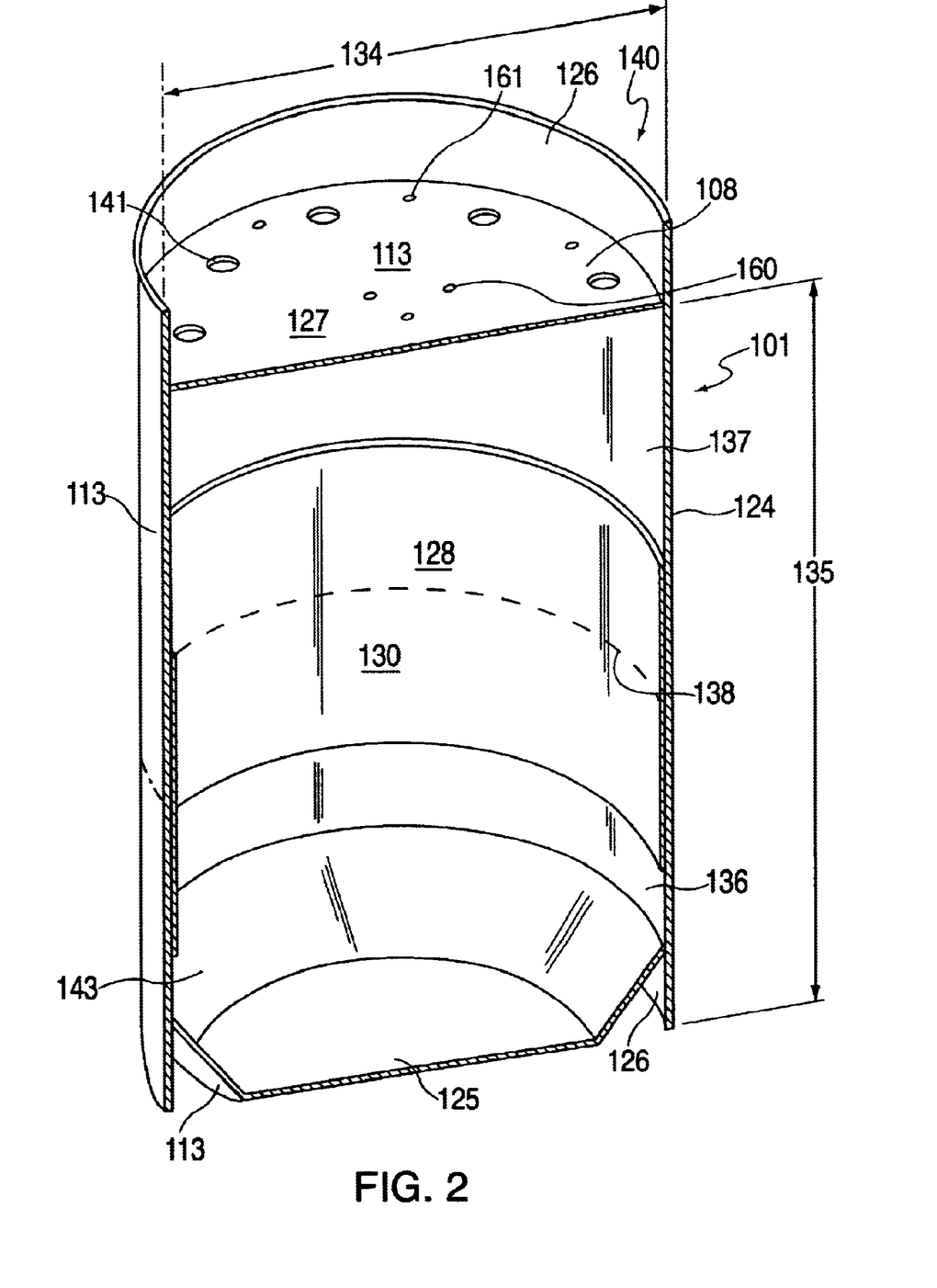
FIG. 2 is a cutaway schematic perspective of a preferred embodiment of a canister for the containment of a radioactive item according to the invention.

FIG. 2 shows a preferred embodiment of a canister for the containment of a radioactive item according to the invention. Canister 101 comprises substantially tubular body 124, interior 128, a first, preferably closed, end 125, and second end 140. Interior 128 is adapted by size and geometric configuration to receive a radioactive item such as an nuclear reactor pressure vessel for storage, transportation, and disposal. Preferably interior 128 is large enough for such radioactive item to be disposed within the canister without difficulty, and to allow the addition of a stabilizer, as described herein, yet simultaneously as small as practicable, in order to reduce the size and weight of the completed package and to ease transportation and handling. Thus length width 134 and length 135 of the canister and in particular the canister interior are large enough to accommodate the item to be contained, but not larger than necessary for the purposes described herein. The selection of suitable dimensions and geometry will not trouble the designer of ordinary skill once he or she has been made familiar with disclosure. For most RPVs substantially circular cross sections will serve satisfactorily, and facilitate easy and inexpensive fabrication and employment of the canister. Body 124 of canister 101 further comprises integral sacrificial fenders 126 located adjacent each end of the canister. Sacrificial fenders 126 are comprised of extensions of body 124 of the canister beyond the end caps or closures of the canister, that is, beyond those portions of the canister actually used for containing the radioactive item, and are adapted to absorb or dissipate shocks administered to the completed containment package by deforming under contact loads. The mechanics of such fenders and their role in attenuating or absorbing shocks are well understood and will be plain to those of skill in the art, given the disclosure herein.

The canister 101 shown in FIG. 2 further comprises lid or other closure means 108, which is adapted for attachment of a portion of the item to be contained. Lid or closure 108 can comprise a simple end plate, as shown, or might take the form of a cap-type enclosure sized to encompass the entire end of the canister, or any other suitable means for closing the canister. In the embodiment depicted in FIG. 2 closure 108 is adapted for the attachment of a portion of the contained device by means of holes 141, which are sized and positioned to accept attachment fittings present on the item to be contained, for example, the head attachment posts in a PWR pressure vessel. Preferably any portions of items to be attached to the exterior of the canister are not highly radioactive, or are sealable in their own right. Lid or top plate 108 further comprises optional fill and vent ports 160 and 161. Central ports 160 are provided for optional filling of the interior of the RPV body with grout or other sealant; peripheral ports 161 for filling the gap between the canister interior and the RPV exterior.

Canister 101 in FIG. 2 further comprises optional secondary circumferential shield 130. Secondary shields are advantageously employed to provide additional containment of relatively highly radioactive portions of any contained items, such as some of the internal structures in a PWR pressure vessel. Preferably circumferential shields are employed in conjunction with cap or lid-type shields such as shields 122 and 142 shown in FIG. 5. A particular advantage of using substantially cylindrical canisters of the type shown in FIG. 2 is that secondary shields are relatively simple to fabricate and install, and provide substantial structural reinforcement as well. In the case of cicumferential shields, open-ended cylinders of nearly the same size as the canister body may be employed, and may be disposed around the inner or outer surfaces of the canister, at any axial position along the canister that may be desired. Cap or lid type shields may be fabricated from flat plate material merely by trimming them to size, and may be placed at any axial location within the canister or covering one or both ends of the canister. In either case it is often suitable, as will be understood by those having ordinary familiarity with the art of radiation shielding, that the same materials as those employed in fabricating the canister body may be used in fabricating secondary shield structures, with substantial savings in cost. Cap or lid shields are particularly useful for providing ALARA (As Low As Reasonably Achievable) shields during stacking of internal parts, external fittings, and/or insulation inside an RPV as described herein, as an added shield against radiation for workers.

Canisters or containment vessels according to the invention and as shown in FIG. 2 are substantially easier and less expensive to fabricate than prior art containment vessels. This is in large part due to their simplified construction, as described. They are also economical to use, especially during the containment and removal of decommissioned RPV's, because they may easily be separated into sections, moved into place for containment of the RPV or other item, and reassembled easily. For example, the containment canister shown in FIG. 2 may be cut anywhere along the length of its body into two or more sections merely by cutting the container, as for example by means of any conventional metal cutting methods, along a circumference such as that shown by reference numeral 138 in FIG. 2, the location of which may be varied anywhere along the body of the canister, such that two sections 136 and 137 result. In such cases reassembly is accomplished merely by replacing second section 137 back in place adjacent to first section 136 and reattaching, as for example by welding. The use of secondary radiation shield 130 also facilitates the use of the canister in this fashion, as it can be used as a doubler or structural reinforcement as well as an additional radiation shield.

Canister 101 may be fabricated economically and easily by rolling or otherwise forming tubular body 124 by conventional means from sheet or plate metal, and welding or otherwise attaching a bottom plate at closed end 125 and lid or closure plate 108. Integral fenders 126 are easily formed in such processes by placing the end closures at a suitable distance from the ends of the body structure, leaving the fenders protruding or extending from the body. Provision of optional fillet 143, which is also readily formed by rolling or other conventional means, is particularly beneficial, as it permits provision of integral fenders 126 as described, in such fashion that fenders 126 are able to perform their function with full efficiency, while optionally permitting the canister weight and the weight of any of its contents to be transferred directly to the floor or other surface on which canister 101 and any contents are placed, without passing through and possibly harming the fenders or reducing their capacity to absorb or dissipate shocks. Optionally fenders 126 are of sufficient depth to allow them to provide protection not only to the containment package as a whole, and in particular to the packaged radioactive item, but also to any additional items, such as removed reactor vessel pressure head, which may be attached to the exterior of the canister.

An early part of the process for containing a radioactive item according to the invention is preparing the radioactive item for packing. Generally this comprises removing at least one external fitting from the item, and optionally portions of the internals of the item as well. A process of preparing the item for packing is shown in FIGS. 3 and 4.

Figure 3:
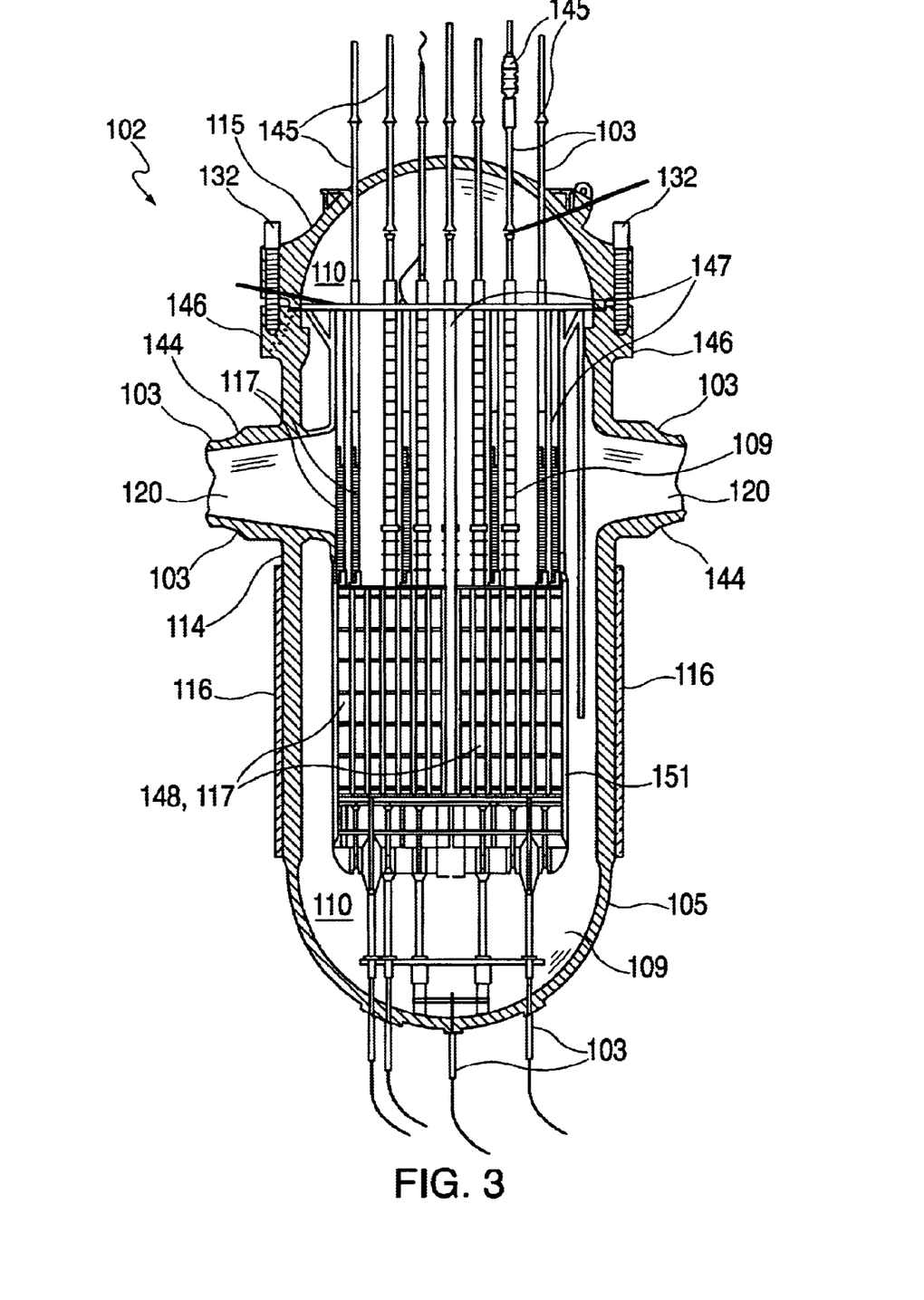
FIG. 3 is a cutaway schematic elevation of an intact radioactive item prior to being processed according to the invention.

FIG. 3 is a cutaway schematic elevation of an intact radioactive item, specifically a PWR pressure vessel, prior to being processed for containment according to the invention. Reactor pressure vessel (RPV) 102 comprises body 114 and head 115, internals 117, and a number of external fittings 103, including water nozzles 144 and control structures 145. Head 115 is joined to body 114 at flange 146 by means of attachments 132, and insulation 116 is in place around exterior 105 of the RPV. Internals 117 comprise upper internals 147 and lower internals 148.

Figure 4:
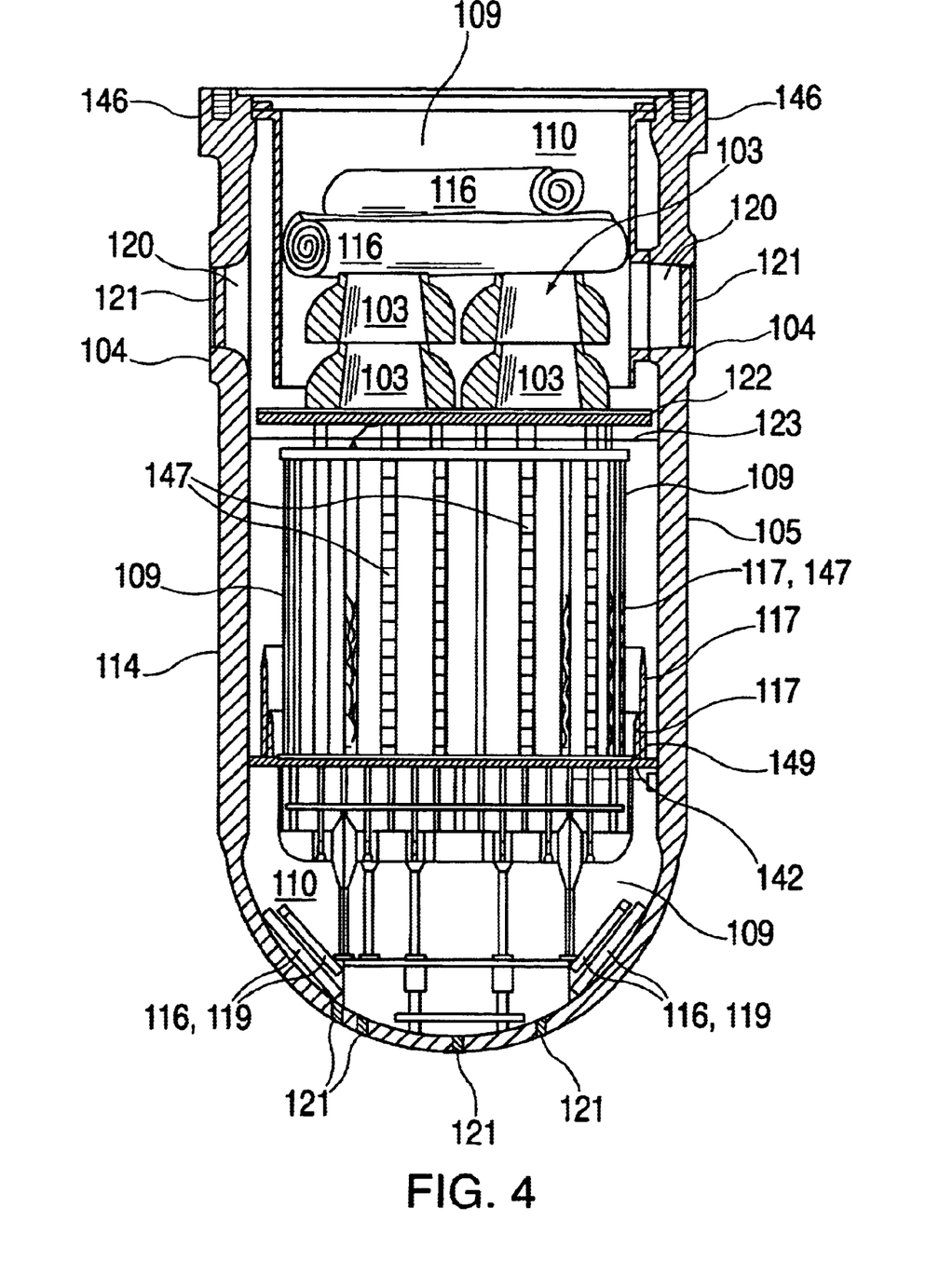
FIG. 4 is a cutaway schematic elevation of a radioactive item processed in at least partial accordance with the invention.

In FIG. 4 the RPV of FIG. 3 has been at least partially processed for containment according to the invention. External fittings 103 have been trimmed so that non-removed portions 104 of the fittings are substantially flush with external surface 105 of body 114. In particular, non-removed portions 104 of the external fittings do not protrude past the outer circumference of flange 146. Moreover, internals portions 148 including the central portion of the core barrel and the core baffle assembly have been removed from interior 109 of the RPV, and upper internals 147 have been stacked on top of support plate 142, which preferably serves also as a secondary radiation shield. Portions 149 of core barrel 151 (FIG. 3) are also disposed within the RPV. Additional portions 119 of the upper internals and insulation 116 removed from the exterior of the RPV are also placed in otherwise vacant space within the RPV body. A secondary support structure and ALARA shield 122 is placed atop internals 117, 147, and removed portions of external fittings 103 are placed thereupon. Additional insulation 116 taken from the exterior of the RPV body is placed atop fittings 103. Penetrations 120 of RPV body 114 have been stopped by means of plugs 121.

As described herein, it is beneficial during at least the first portions of this process to leave the reactor coolant fluid or other liquid in the RPV, to serve as a radiation shield for those working on the containment process. Preferably this is accomplished by leaving water or other liquid in the RPV body to at least the level of 123 in FIG. 4 until the more highly-radioactive components of the core have been removed and all penetrations 120, for example, have been plugged; at this point it is advantageous to drain the fluid, install secondary supports and shield structures such as 142 and 122, and proceed with packaging.

Figure 5:
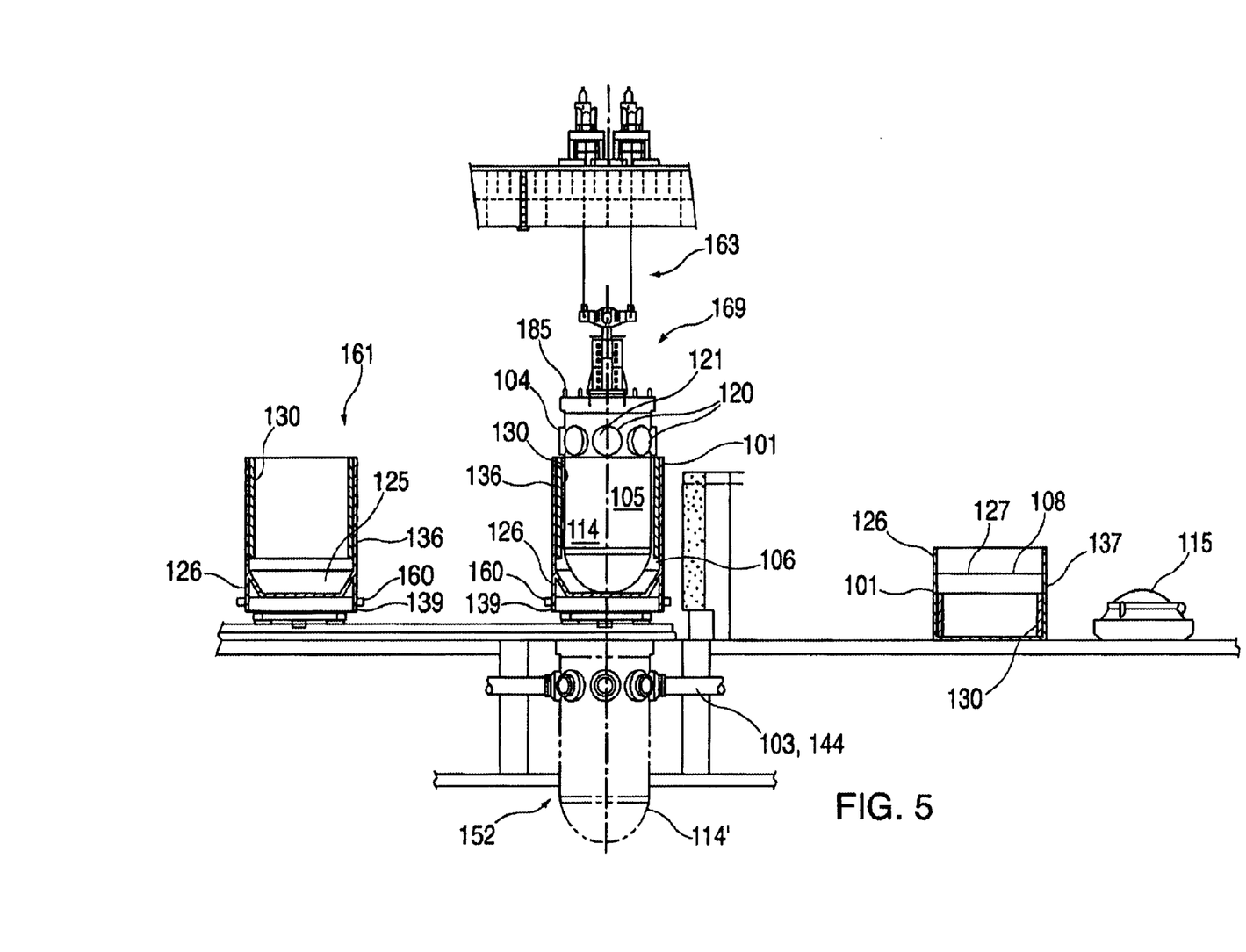
FIG. 5 is a schematic view of a radioactive item being disposed within a canister in accordance with the invention.

FIG. 5 is a schematic view of a radioactive item being disposed within a canister in accordance with the invention.

Presented is one scenario of placing RPV 102 within canister 101. This scenario can be altered to accommodate plant specific and unique conditions. Internal shields 130 are welded to lower section 136 and upper section 137 of the canister during manufacturing. Lower section 136 of canister 101 has been placed atop transfer cart 160 with a removal frame and trunnions 139. Transfer cart 160 with lower section 136 has initially been placed in position 161 near RPV installation point 152. Head 115 of RPV 102 has been removed and lifting device 163 attached to RPV body 114. RPV 102 has been disconnected from the remainder of the plant of which it formed part by disconnecting external fittings 103, including piping 144, and penetrations 120 in RPV body 114 have been sealed. RPV external surfaces 105 are sealed with paint or other suitable substance to immobilize surface contaminants. RPV body 114 has been removed from RPV installation 152 and raised, whereupon transfer cart 160 with lower section 136 has been moved into loading position 169, and RPV body 114 has been disposed within section 136 of the canister. Canister 101 and RPV body 114 are ready for a stabilizer to be introduced in gap 106 between the RPV body 114 and the interior wall of canister 101. After gap 106 has been filled to a level sufficient to allow the stabilizer to support RPV body 114 and the stabilizer allowed time to set sufficiently, or RPV body 114 otherwise sufficiently supported, upper section 137 of canister 101 is placed over the RPV body and reattached to lower section 136 by welding or other suitable means. RPV studs 185 are installed through top plate 108 of upper section 137 into the flange of RPV body 114. Spray metalizing is used to seal openings between between RPV studs 185 and attachment penetrations 141 (FIG. 2) through upper section 137. Head 115 is placed atop external surface 127 of the canister, and fixed thereto, preferably by means of head attachments 132 threaded onto RPV studs 185. If necessary, the completed containment package will be turned about its upright longitudinal axis by pivoting the package with trunnions 139 on the removable frame on lower section 136. The package may then be removed from the plant housing and made ready for shipment by removing the frame with trunnions 139. It may be seen that division of canister 101 into two or more sections provides a number of benefits, such as a reduction in clearance height requirements to place RPV body 102 within the canister. This is especially beneficial in the limited workspaces of most nuclear plant installations.

Figure 6:
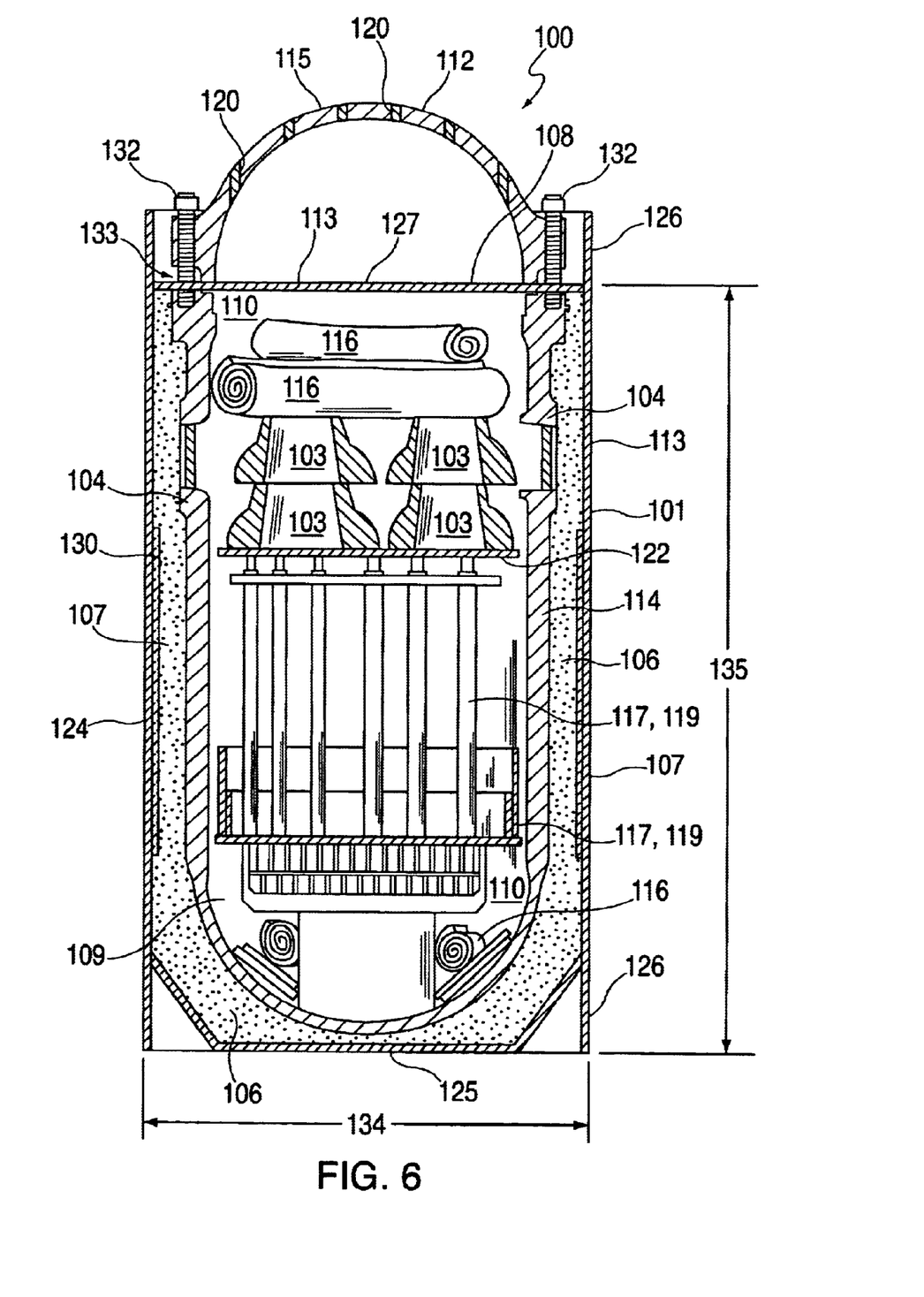
FIG. 6 is a cutaway schematic view of a radioactive item packaged in accordance with the invention.

FIG. 6 is a cutaway schematic view of a radioactive item packaged in accordance with the invention. In addition to elements shown in other Figures, stabilizer 107 is shown substantially filling gap 106 between canister 101 and RPV 102. RPV head is in place atop lid 108 of the canister, and attached by means of RPV head-body attachments 132, which, together with stabilzer 107, further comprise the sole attachment between the RPV body and the containment canister. Optionally the entire interior of the RPV body is filled with stabilizer 107, to further immobilize contaminants and stored components.

EXAMPLE 1

A containment package for a PWR pressure vessel is described. This example corresponds to plans for disposal of the Connecticut Yankee PWR. A containment canister according to the invention and as shown generally in FIG. 2, including top and bottom plates and fillet, is fabricated from three-inch thick structural carbon steel. Secondary shielding of two-inch thick carbon steel is placed within the canister body so as to shield the most highly radioactive portions of the completed package. The canister is fabricated in two sections, with the weld seam located behind the secondary shielding on rejoining. Rejoining is accomplished by full penetration weld. The canister, including integral fenders, 35' 3" feet in length, 17' 10" diameter, and weighs 190 tons empty. The completed package, with stabilizing grout and externally-attached RPV head, weighs 800 tons. The height of the package, with head attached, is 39' 7". The head and RPV body are attached to each other, and to the canister, by means of the approximately twelve (12) head closure studs present on the reactor in service, which pass through canister lid and into upper flange of the RPV body. The canister provides containment shielding equivalent to DOT Industrial Package type 2, analyzed to withstand a 1 foot horizontal drop and a 1 foot drop with 2 feet of slap-down at either end. Ninety-nine point eight (99.8) percent of the radioactive material present is intrinsically contained within RPV activated metals themselves; remaining 0.2% is affixed to metal surfaces and is immobilized by grout or epoxy.

EXAMPLE 2

A method for placing and sealing a PWR pressure within a containment vessel is described. The RPV is disconnected from external piping, controls, and the like, and the head is removed, as described and as shown generally in FIGS. 2–6. Highly radioactive portions of the internals are removed for separate containment and storage. Segmented internals, including particularly upper internal components, are placed inside the RPV body as described. Nominal 30 pcf low-density cellular concrete (LDCC) is placed inside the RPV body to seal and immobilize remaining and relocated internals. The RPV body is lifted over and lowered into position within the canister lower section, with a gap between the RPV and the canister interior. Nominal 70 pcf LDCC is poured into the gap to a sufficient depth to support the RPV after curing, and is allowed to cure. The lifting rig used to position the RPV is removed. Removed portions of the RPV nozzles are placed inside the RPV, atop an ALARA plate. RPV head closure guide studs (ref. 132 in FIG. 6) are installed in some of the RPV head attachment stud holes. The canister upper section is lifted and lowered into place over the guide studs, so that it rests upon the RPV head flange. RPV hold down studs are installed using remaining RPV head attachment stud holes. The canister upper and lower sections are welded together. Openings between the canister top plate and the RPV hold down and guide studs are sealed with metalizing spray. Nominal 70 pcf LDCC is pumped into remaining voids between the canister and the RPV body through peripheral fill ports opened in the top of the canister. Nominal 30 pcf LDCC is pumped into remaining voids inside the RPV body through center fill ports opened in the canister top plate. Fill and vent ports in the canister top plate are plugged and sealed. The RPV head is placed on top of the canister and the guide studs already in place. The guide studs are cut flush with the top of the RPV head flange. All LDCC is allowed to complete curing. The package is rigged for removal from the assembly location by the attachment of lugs and/or other structures to the canister exterior. The package is lifted and turned to a substantially horizontal position, secured to transport conveyance, and transported to a disposal site.

Preferred embodiments of the various structures disclosed herein are fabricated from any materials having sufficient strength, durability, corrosion resistance, and radioactive shielding qualities to serve the purposes described for such structures. Suitable materials are known, and have been identified herein where appropriate; but any materials having suitable qualities will serve.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method of containing a nuclear reactor pressure vessel for transportation and storage, the method comprising:
    removing at least one external fitting from a nuclear pressure vessel to an extent that a non-removed portion of said fitting is substantially flush with an external surface of said pressure vessel;
    disposing a body of said pressure vessel within a canister;
    substantially filling a gap between an interior of said canister and said pressure vessel with a stabilizer;
    disposing said removed external fitting within said pressure vessel body; and
    closing said canister.

2. A method of containing a nuclear reactor pressure vessel for transportation and storage, the method comprising:
    removing a portion of said pressure vessel which is of low radioactivity;
    removing at least one external fitting from said nuclear pressure vessel to an extent that a non-removed portion of said fitting is substantially flush with an external surface of said pressure vessel;
    disposing a body of said pressure vessel within a canister;
    substantially filling a gap between an interior of said canister and said pressure vessel with a stabilizer;
    closing said canister; and
    attaching said portion which is of low radioactivity to an exterior of said canister.

3. A method of containing a nuclear reactor pressure vessel for transportation and storage, the method comprising:
    removing at least one external fitting from a nuclear reactor pressure vessel;
    disposing a body of said pressure vessel within a canister;
    substantially filling a gap between an interior of said canister and said pressure vessel with a stabilizer;
    disposing said removed external fitting within said pressure vessel body; and
    closing said canister.

4. The method of claim 3, comprising coating interior and exterior surfaces of said pressure vessel with sealant.

5. The method of claim 3, wherein said filling said gap with stabilizer comprises substantially filling said gap with low density cellular concrete.

6. The method of claim 3, comprising sealing said canister with a metalizing spray.

7. The method of claim 3, comprising:
    removing a portion of said pressure vessel which is of low radioactivity; and
    attaching said portion to an exterior of said canister.

8. The method of claim 3, comprising filling at least a portion of said pressure vessel body with a stabilizer.

9. The method of claim 3, wherein substantially filling said gap with stabilizer comprises completely filling said gap with stabilizer.

10. A method of containing a nuclear reactor pressure vessel for transportation and storage, the method comprising:
    removing from a nuclear reactor pressure vessel a portion of said pressure vessel which is of low radioactivity;
    disposing a body of said pressure vessel within a canister; and
    attaching said removed portion to an exterior of said canister.

11. The method of claim 10, comprising coating interior and exterior surfaces of said pressure vessel body with sealant.

12. The method of claim 10, comprising substantially filling a gap between an interior of said canister and said pressure vessel body with a stabilizer.

13. The method of claim 12, wherein substantially filling said gap with stabilizer comprises completely filling said gap with stabilizer.

14. The method of claim 12, wherein filling said gap with stabilizer comprises substantially filling said gap with low density cellular concrete.

15. The method of claim 10, comprising filling at least a portion of said pressure vessel body with a stabilizer.

16. The method of claim 10, comprising sealing said canister with a metalizing spray.

17. A method of containing a nuclear reactor pressure vessel for transportation and storage, the method comprising:
    removing a head, at least a substantial portion of all protruding external fittings, and at least a substantial portion of external insulation from a nuclear reactor pressure vessel;
    removing a portion of reactor internals from an interior of said pressure vessel;
    relocating at least some of said removed external fittings, insulation, and internals within said interior of said pressure vessel;
    sealing penetrations in said pressure vessel;
    disposing a body of said pressure vessel within a container;
    closing said container;
    sealing said container; and
    attaching said head to an exterior of said container.

18. The method of claim 17, comprising coating an interior surface of said pressure vessel with sealant.

19. The method of claim 17, comprising substantially filling a gap between an interior of said container and said pressure vessel with a stabilizer.

20. The method of claim 19, wherein said filling said gap with stabilizer comprises substantially filling said gap with low density cellular concrete.

21. The method of claim 19, wherein substantially filling said gap with stabilizer comprises completely filling said gap with stabilizser.

22. The method of claim 17, wherein removing at least a substantial portion of said protruding external fittings comprises removing said external fittings to the extent that any unremoved portions of said fittings protrude no further from said pressure vessel body than an outer perimeter of a head-to-body joint flange on said pressure vessel body.

23. The method of claim 17, comprising filling at least a portion of said pressure vessel body with a stabilizer.

24. The method of claim 17, comprising removing at least a portion of an internals set of said pressure vessel and replacing said removed internals portion with a radiation shield before at relocating at least a portion of said removed external fittings, insulation, and internals set within said interior of said pressure vessel.

25. The method of claim 17, comprising sealing said container with a metalizing spray.

26. The method of claim 17, comprising removing said portion of reactor internals while said reactor pressure vessel is partially filled with liquid.

* * * * *